United States Patent
Calderone et al.

(10) Patent No.: US 9,944,508 B2
(45) Date of Patent: Apr. 17, 2018

(54) DISPENSER WITH OPENABLE DOOR

(71) Applicant: NESTEC S.A., Vevey (CH)

(72) Inventors: Roberto Angelo Calderone, Orny (CH); Cedric Rey, La Sarraz (CH); Silvio Lardelli, St. Gallen (CH); Julian Wamsler, St. Gallen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 15/329,394

(22) PCT Filed: Jul. 27, 2015

(86) PCT No.: PCT/EP2015/067162
§ 371 (c)(1),
(2) Date: Jan. 26, 2017

(87) PCT Pub. No.: WO2016/016191
PCT Pub. Date: Feb. 4, 2016

(65) Prior Publication Data
US 2017/0217749 A1 Aug. 3, 2017

(30) Foreign Application Priority Data
Jul. 30, 2014 (EP) .................................... 14179070

(51) Int. Cl.
*B67B 1/00* (2006.01)
*B67D 1/08* (2006.01)
*A47J 31/44* (2006.01)

(52) U.S. Cl.
CPC ........ *B67D 1/0888* (2013.01); *A47J 31/4403* (2013.01); *B67D 1/0878* (2013.01); *B67D 2210/00041* (2013.01)

(58) Field of Classification Search
CPC ........ B67D 1/0888; B67D 2210/00041; B67D 1/0878; A47J 31/4403

(Continued)

(56) References Cited

U.S. PATENT DOCUMENTS

2009/0183641 A1* 7/2009 Verhoeven ............ A47J 31/401
99/323.3

FOREIGN PATENT DOCUMENTS

| DE | 102011087445 | 6/2013 |
| GB | 2067311 | 7/1981 |
| WO | 8304447 | 12/1983 |

* cited by examiner

*Primary Examiner* — Jeremy W Carroll
(74) *Attorney, Agent, or Firm* — K&L Gates LLP

(57) ABSTRACT

The invention concerns a dispenser (1) comprising: —a housing (2) defining an internal space (3), —a beverage preparation unit housed in the internal space, said beverage preparation unit being connected to an electric supply, —a door (4) to get access to the internal space of the housing, said door being assembled to the housing (2) by means of at least one hinge (5), said door comprising one element erecting from the internal surface of the door, said door being configured for switching off the electric supply of the beverage preparation unit when it opens, the switching off being due to the release of a mechanical and electric contact by the at least one erecting element, wherein the dispenser comprises a slider (6), said slider comprising: —a first part (61) configured for switching on the electric supply of the beverage preparation unit when the slider is translated from a first rest position to a second operative position, and —a second part (62) configured for engaging with a locking device (7) when the slider (6) is translated to the second operative position so that the slider is retained in said second operative position by the locking device, and wherein the element erecting from the internal surface of the door is configured for disengaging the second part of the slider from the locking device (7) when the door is closed.

9 Claims, 3 Drawing Sheets

(58) Field of Classification Search
USPC .................................................. 222/153.01
See application file for complete search history.

DISPENSER WITH OPENABLE DOOR

CROSS REFERENCE TO RELATED APPLICATIONS

The present application is a National Stage of International Application No. PCT/EP2015/067162, filed on Jul. 27, 2015, which claims priority to European Patent Application No. 14179070.9, filed Jul. 30, 2014, the entire contents of which are being incorporated herein by reference.

FIELD OF THE INVENTION

The present invention relates to beverage dispensers comprising a door providing technicians with an access to the internal parts of the dispenser.

BACKGROUND OF THE INVENTION

Food dispensers, in particular beverage dispensers, usually comprise a housing defining an internal space in which devices for preparing the beverages are positioned. These devices can be devices for storing, dosing, mixing, beverage ingredients and pumping, heating, cooling, diluents. Most of these devices are connected to motors and directly or indirectly to a general electric supply.

In order to have access to these devices either for current maintenance or for repair, the dispensers usually comprise a door. For security reasons, the opening of the door immediately leads to the switching off of the electric supply in the machine. Then there is no risk that the person in charge of refilling the dispenser with beverage ingredients or of cleaning the devices may be hurt. Usually the automatic shutting off is due to the change of position of the door that does not maintain a mechanical and electrical contact in the dispenser any longer.

Yet when the dispenser is opened by a technician in charge of technical tasks like control, repair or calibration, these operations require that the electric supply of the dispenser is switched on. Consequently the technicians usually own a specific key or tool to switch on the dispenser even if the door is opened. The key or tool creates the mechanical and electrical contact in place of the door.

One common issue encountered with this key or tool is that the technician frequently loses it and is not able to use it again.

Another common issue is that the technician forgets to remove the key or tool from the dispenser once he has finished his work on the dispenser and closes the door before removing the key or tool. This leads to damaging of the door and the key or tool.

An object of the present invention is to provide a solution to the above issues.

SUMMARY OF THE INVENTION

According to a first aspect, there is provided a dispenser comprising:
- a housing defining an internal space,
- a beverage preparation unit housed in the internal space, said beverage preparation unit being connected to an electric supply,
- a door to get access to the internal space of the housing, said door being assembled to the housing by means of at least one hinge, said door comprising one element erecting from the internal surface of the door, said door being configured for switching off the electric supply of the beverage preparation unit when the door is opening, the switching off being due to the release of a mechanical and electric contact by the at least one erecting element, wherein the dispenser comprises a slider, said slider comprising:
- a first part configured for switching on the electric supply of the beverage preparation unit when the slider is translated from a first rest position to a second operative position, and
- a second part configured for engaging with a locking device when the slider is translated to the second operative position so that the slider is retained in said second operative position by the locking device, and wherein the element erecting from the internal surface of the door is configured for disengaging the second part of the slider from the locking device when the door is closing.

Preferably the slider presents two ends and comprises at one first end two arms, the first arm corresponding to the first part of the slider and the second arm corresponding to the second part of the slider.

According to the preferred embodiment the second part of the slider comprises a stud rising from its surface In said embodiment the locking device preferably comprises an inclined surface cooperating with the stud of the second part of the slider so that, when the slider is translated to the second operative position, the stud is able to slide along said inclined surface until the end of said inclined surface where it is locked.

During the translation of the slider, the second arm is compressed by the inclined surface of the locking device and suddenly released and locked when the pin reaches the end of the inclined surface.

Preferably the stud presents a biased surface and can slide along the cooperating inclined surface of the locking device the stud is locked.

Preferably the lengths of the two arms and of the inclined surface of the locking device are set so that when the stud of the second arm locks to the end of the inclined surface, the first arm switches on the electric supply of the beverage dispenser.

According to a specific embodiment the element erecting from the internal surface of the door is a hinge of the door. Said hinge of the door usually presents the shape of an elbow, said elbow being attached at one first end to one shaft, said shaft being part of the housing, and attached at one second end to the door, wherein the external curve of the elbow is configured for disengaging the end of the second part of the slider when said second arm is locked to the end of the inclined surface Preferably the second end of the slider is attached to a spring, the spring being stretched when the slider is translated to the second operative position.

Preferably the slider is configured for being manually translated.

In the present application the terms "internal" and "top" are used to describe the relational positioning of features of the invention. These terms should be understood to refer to the container in its normal orientation when positioned in a beverage dispenser for the production of a beverage as shown in FIG. 1.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures, in which.

DETAILED DESCRIPTION OF THE DRAWINGS

Figure 1:
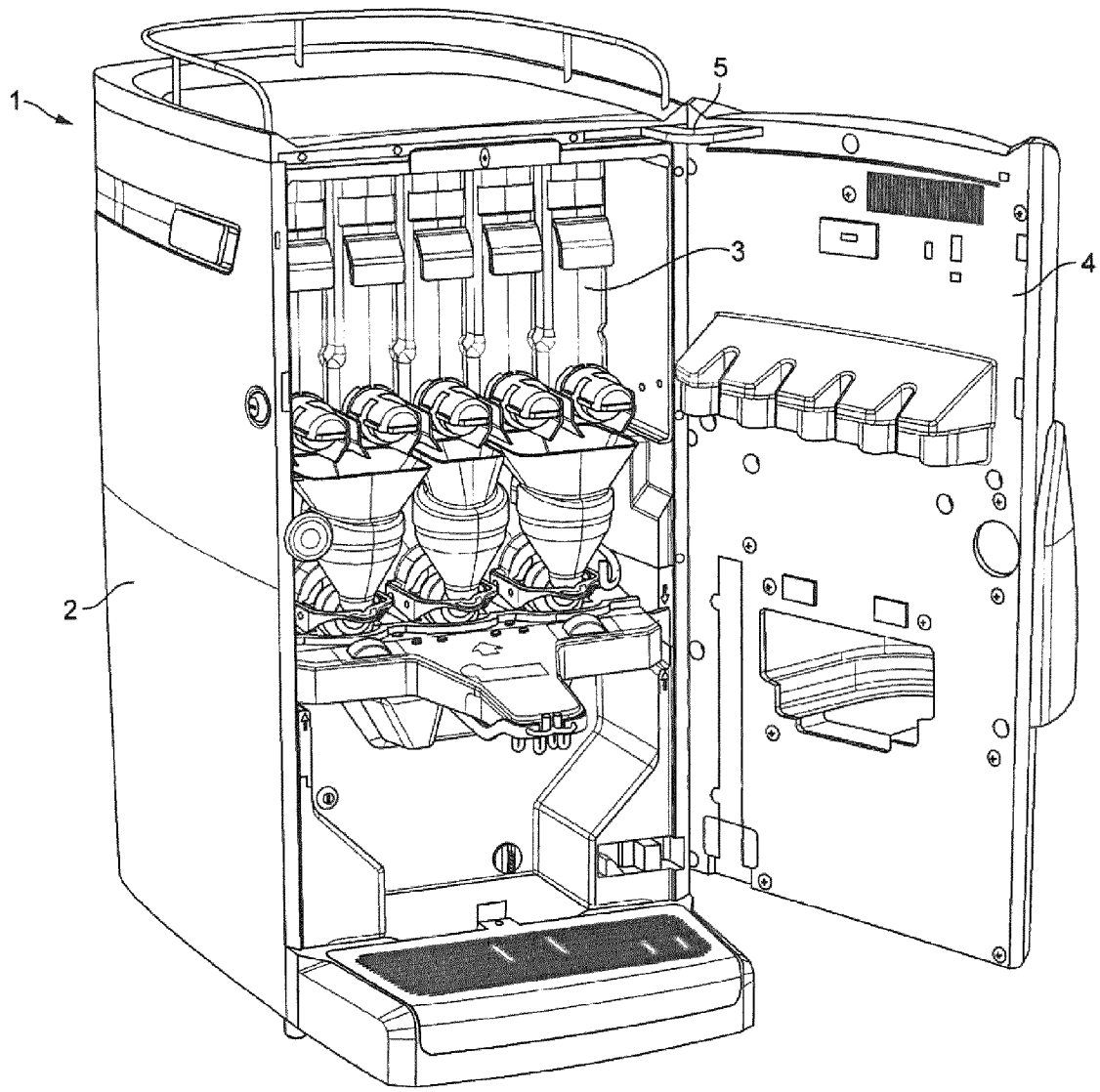
FIG. 1 is a view of a beverage dispenser with an openable door.

FIG. 1 illustrates a beverage dispenser 1 comprising a housing 2 defining an internal space 3 in which a beverage preparation unit is housed. In the illustrated embodiment the beverage preparation unit comprises beverage powder tanks, mixing chambers for mixing powder and water, and dispensing tubes. Yet any other type of beverage preparation unit can be used in the housing.

The dispenser comprises a door 4 to get access to the internal space 3 of the housing. The door is assembled to the housing 2 by means of at least one hinge 5 at the top of the door.

Figure 2:
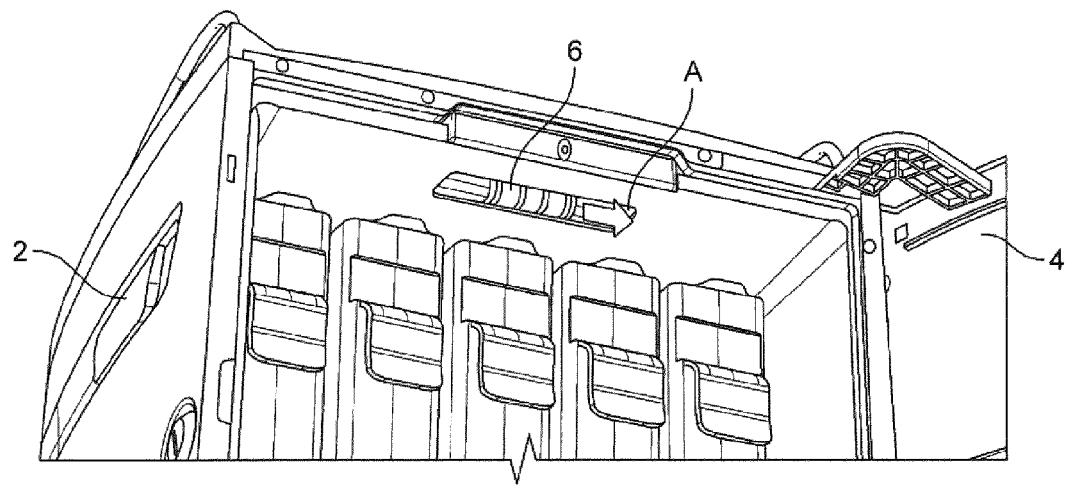
FIG. 2 illustrates the steps to be implemented by the technician to switch on the dispenser though the door is opened according to the present invention.

FIG. 2 illustrates the view of the top of the internal space 3 of the dispenser once the door 4 has been opened by the technician. In this situation, due to the door opening, the electrical supply has been switched off. For this reason, the technician is incited to translate the slider 6 according to the arrow A to the right. The drawer is accessible for the technician through an opening in the top part of the internal housing. This movement of the slider 6 has the effect of switching on the electrical supply of the dispenser again.

The extracted view in FIG. 2 illustrates this translation of the slider 6 inside the top part of the dispenser.

Figure 4:
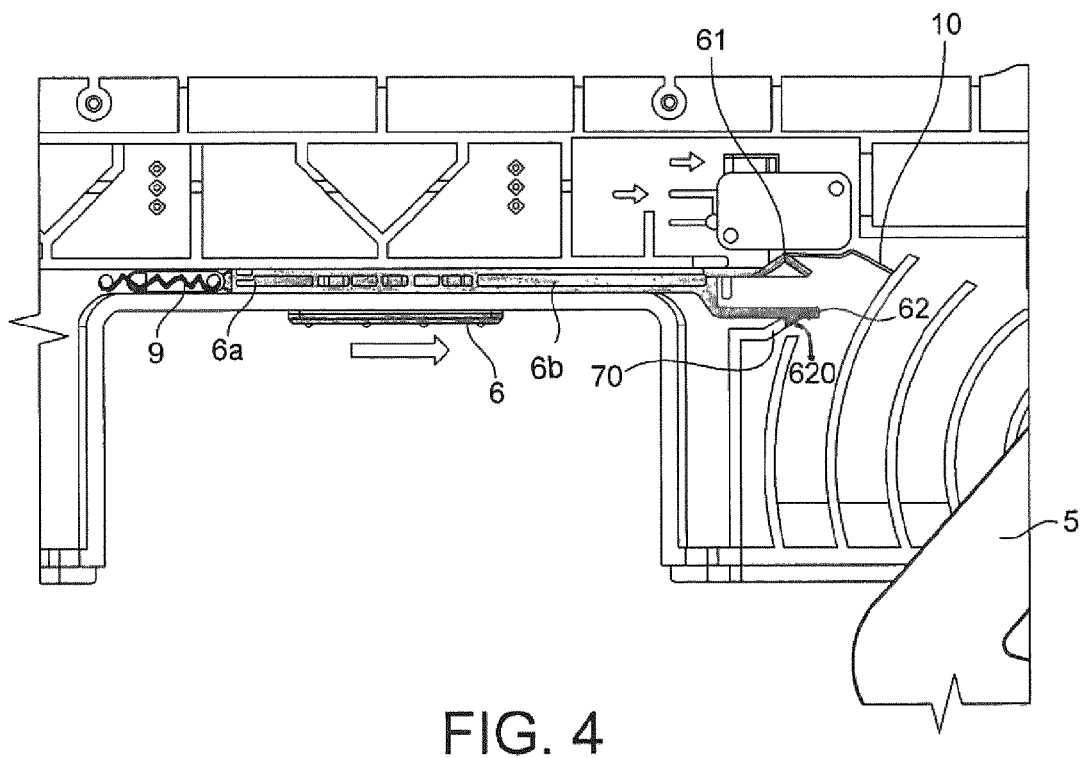
FIG. 4 is a top view of the mechanism for controlling the electric supply of the dispenser, the door being opened and the technician having already translated the slider to the right.

The effect of the translation of the slider is illustrated in FIG. 4. The slider 6 is drawn in grey. The translation of the slider 6 induces the translation of the first arm 61 of the slider against a flexible plate 10 which enables the closure of the electrical circuit in the dispenser. The translation also induces the translation of the second arm 62 of the slider so that said arm is locked by a surface 70 of a locking device. The end of the second arm 62 of the slider comprises a stud 620 that is engaged with the end of the surface 70 of the locking device 7. In this position the dispenser is switched on while the door is opened. Accordingly the technician can operate the dispenser.

Figure 3:
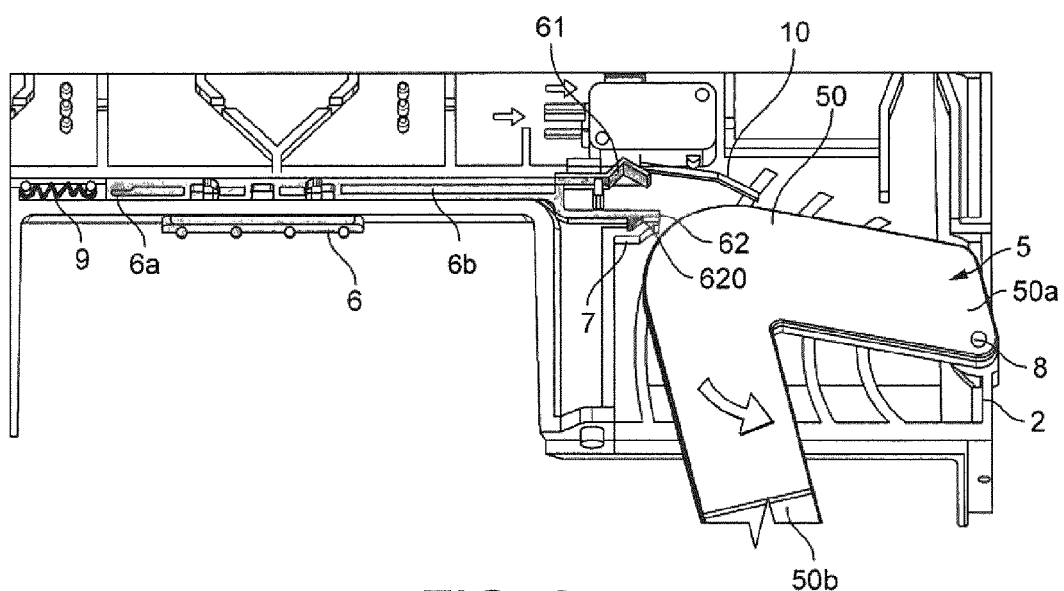
FIG. 3 is a top view of the mechanism for controlling the electric supply of the dispenser while the door is beginning to open.

FIG. 3 illustrates the mechanism for moving the door and controlling the electric supply of the dispenser while the door is beginning to open. In this situation the slider 6 has not been translated to the right: there is no cooperation of the slider parts 61, 62 either with the flexible plate 10 or the locking device 7. When the dispenser is in operation and the door is closed, the hinge 5 pushes the flexible plate 10 back against a pin switching on the electrical circuit of the dispenser. But, in the position illustrated in FIG. 3, the hinge 5 of the door has released its engagement with the flexible plate 10. Consequently, in this position of the door, the electric supply of the dispenser has been switched off.

Figure 5:
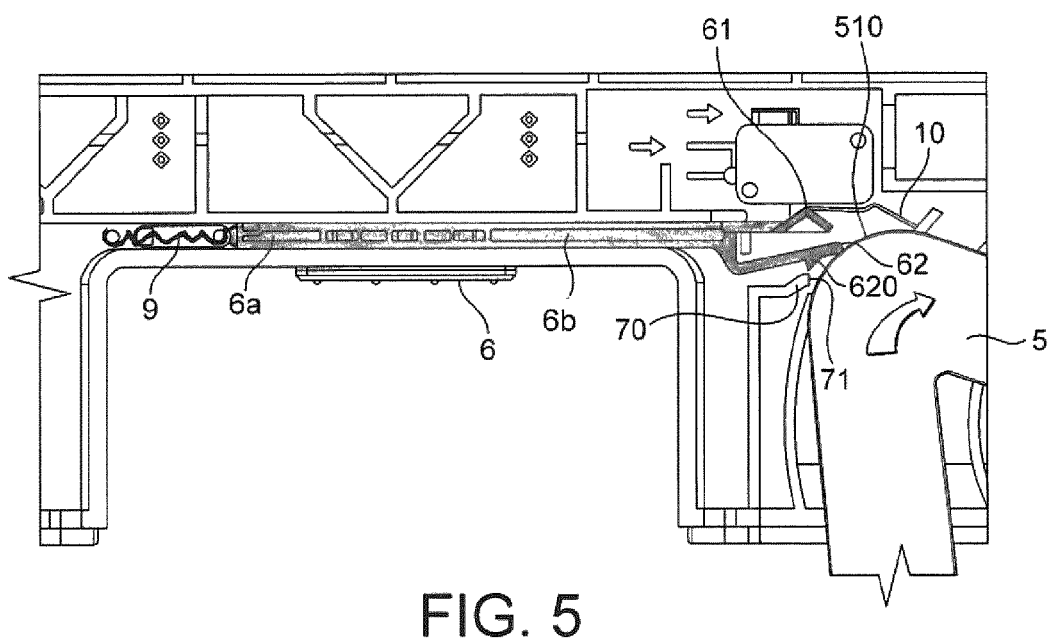
FIG. 5 is a top view of the mechanism for controlling the electric supply of the dispenser, the door being closing.

FIG. 5 illustrates the mechanism for controlling the electric supply of the dispenser, while the door is closing. During the closing movement of the door, the external curve 510 of the elbow of the hinge interacts and pushes the end of the second arm 62 of the slider so that the stud 620 is disengaged from the end 71 of the locking device. As the slider 6 is attached at its first end 6a to a spring 9, said spring being stretched due to the translation of the slider 6 to the right, the fact of disengaging the second arm 62 enables the spring to pull the slider back to the left. Due to the translation of the slider 6 to the left, the first arm 61 is going to stop engaging the flexible plate 10 but, as the closing of the door goes, the external curve 510 of the elbow of the hinge is going to push said flexible plate 10 in place of the first arm 6, so that the machine is switched when the door is closed.

The present invention presents the advantage of simplifying the maintenance of the machine by the technician since he does not have to follow a particular instruction to switch on the dispenser after door opening; he simply has to slide the slider.

Another advantage is that by closing the door, the machine goes back to the default mode automatically without risk of breaking a key or a door opening tool by lack of attention.

An advantage is that there is no need for the technician to bring a specific key or door opening tool for the maintenance of the dispenser. There is no risk that he forgets to bring it or lose it.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

The invention claimed is:

1. A beverage dispenser comprising: a housing defining an internal space;
  a beverage preparation unit housed in the internal space, the beverage preparation unit being connected to an electric supply;
  a door to obtain access to the internal space of the housing, the door being assembled to the housing by at least one hinge, the door comprising at least one element from the internal surface of the door, the door being configured for switching off the electric supply of the beverage preparation unit when the door opens, the switching off being due to the release of a mechanical and electric contact by the at least one extending element extending from the internal surface of the door;
  the beverage dispenser comprises a slider, the slider comprising:
  a first part configured for switching on the electric supply of the beverage preparation unit when the slider is translated from a first rest position to a second operative position, a second part configured for engaging with a locking device when the slider is translated to the second operative position so that the slider is retained in the second operative position by the locking device; and wherein the at least one element extending from the internal surface of the door is configured for disengaging the second part of the slider from the locking device when the door is closed.

2. The beverage dispenser according to claim 1 wherein the slider presents first and second ends, the first end comprises first and second arms, the first arm corresponding to the first part of the slider, and the second arm corresponding to the second part of the slider.

3. The beverage dispenser according to claim 2, wherein the second part of the slider comprises a stud rising from a surface of the second part of the slider.

4. The beverage dispenser according to claim 3 wherein the locking device comprises an inclined surface cooperating with the stud of the second part of the slider so that, when the slider is translated to the second operative position, the stud is able to slide along the inclined surface until an end of the inclined surface where the stud is locked.

5. The beverage dispenser according to claim 4 wherein the at least one hinge of the door comprises at least one elbow, a first end of the at least one elbow is attached to a shaft, the shaft being part of the housing, a second end of the at least one elbow is attached to the door, wherein an external curve of the elbow is configured for disengaging an end of the second part of the slider when the second arm is locked to the end of the inclined surface.

6. The beverage dispenser according to claim 3 wherein the lengths of the first and second arms and of the inclined surface are set so that when the stud of the second arm locks to the end of the inclined surface, the first arm switches on the electric supply.

7. The beverage dispenser according to claim 2 wherein the second end of the slider is attached to a spring, the spring being stretched when the slider is translated to the second operative position.

8. The beverage dispenser according to claim 1 wherein the at least one element extending from the internal surface of the door is the at least one hinge of the door.

9. The beverage dispenser according to claim 1 wherein the slider is configured for being manually translated.

* * * * *